United States Patent
Roldan et al.

(10) Patent No.: US 11,082,814 B1
(45) Date of Patent: Aug. 3, 2021

(54) TECHNIQUES FOR MANAGING AND USING TELECOMMUNICATION CARRIER DEACTIVATION LISTS

(71) Applicant: Bandwidth, Inc., Raleigh, NC (US)

(72) Inventors: Brad Roldan, Sunnyvale, CA (US); Mark Macchioni, Apex, NC (US)

(73) Assignee: Bandwidth, Inc., Raleigh, NC (US)

( * ) Notice: Subject to any disclaimer, the term of this patent is extended or adjusted under 35 U.S.C. 154(b) by 0 days.

(21) Appl. No.: 17/238,284

(22) Filed: Apr. 23, 2021

(51) Int. Cl.
*H04W 4/00* (2018.01)
*H04W 4/14* (2009.01)

(52) U.S. Cl.
CPC .................................... *H04W 4/14* (2013.01)

(58) Field of Classification Search
CPC ............ H04W 4/14; H04W 4/12; H04W 4/06
See application file for complete search history.

(56) References Cited

U.S. PATENT DOCUMENTS

| | | | |
|---|---|---|---|
| 8,369,826 B2* | 2/2013 | Alla | H04W 8/10 455/405 |
| 2011/0053618 A1* | 3/2011 | Lin | H04L 51/38 455/466 |

* cited by examiner

*Primary Examiner* — Omoniyi Obayanju
(74) *Attorney, Agent, or Firm* — Gregory Stephens (57) ABSTRACT

Techniques are described for managing the recipients of application-to-person (A2P) short message service (SMS) messages. A send-to list comprised of telephone numbers to which to send A2P short message service (SMS) messages is received from an A2P sender. The opt-in/opt-out status of each telephone number on the send-to list is determined. Telephone numbers on the send-to list that cannot be verified as opt-in status are flagged as opt-out status. The A2P sender is then prevented from sending of A2P SMS messages to telephone numbers flagged as opt-out status.

18 Claims, 4 Drawing Sheets

| Customer List of TNs | |
|---|---|
| Optin | NXX-NXX-XXXX |
| In | 9195576245 |
| In | 9194536987 |
| In | 9192765346 |
| In | 9195026581 |
| In | 9198347843 |
| In | 6093053456 |
| In | 6094520594 |
| In | 6097654939 |
| In | 6098276463 |
| In | 6093057683 |
| In | 6098357652 |

FIG. 4
400

| Carrier "A" Deact List | | |
|---|---|---|
| Telephone Number | Date | Carrier |
| 3649034595 | 03/23/20 | A |
| 4639072345 | 03/23/20 | A |
| 9192765346 | 03/23/20 | A | ← 410
| 7653453456 | 03/23/20 | A |
| 9198347843 | 03/23/20 | A | ← 420
| 7094562893 | 03/23/20 | A |
| 9805064545 | 03/23/20 | A |
| 6097654939 | 03/23/20 | A | ← 430
| 5093456789 | 03/23/20 | A |
| 2183457035 | 03/23/20 | A |
| 6098357652 | 03/23/20 | A | ← 440

FIG. 5
500

| Porting Data (03/23/20) | | | |
|---|---|---|---|
| Telephone Number | Port Date | Previous Carrier | Current Carrier |
| 9195675945 | 02/06/17 | A | C |
| 9194536987 | 04/25/17 | D | A |
| 9192765346 | 07/05/18 | B | A |
| 9195075651 | 08/23/19 | A | D |
| 9198347843 | 03/22/20 | A | B | ← 510
| 6093053456 | 05/09/18 | C | D |
| 6094510594 | 10/23/18 | B | C |
| 6097654939 | 10/05/18 | C | D |
| 6095275485 | 09/25/19 | D | A |
| 6097057685 | 01/16/20 | A | B |
| 6098357652 | 05/07/19 | C | B |

FIG. 6

TECHNIQUES FOR MANAGING AND USING TELECOMMUNICATION CARRIER DEACTIVATION LISTS

TECHNICAL FIELD

Examples described herein are generally related to techniques for utilizing carrier deactivation lists and other industry telephony databases to curate and manage lists of telephone numbers eligible to receive short message service (SMS) text messages or multi-media message service (MMS) messages. MMS differs from SMS in that it allows for the inclusion of certain media (e.g., audio, video, data files) embedded with the message. The remainder of the disclosure herein references SMS messages but the principles apply equally to MMS messages.

BACKGROUND

SMS messaging typically involves the sending of a relatively short (160 characters or less) message that is addressed to a telephone number. The telephone number, in turn, may be associated with one or more mobile or computer devices. Originally, SMS messaging was conceived as a very convenient and unobtrusive way to communicate a person to person (P2P) over a cellular network. All one mobile telephony subscriber needed to address and send and SMS message was the telephone number of another mobile telephony subscriber. The SMS message would traverse from the first mobile device to the carrier infrastructure for that mobile device to the carrier infrastructure of the destination mobile device to the destination mobile device. It is possible there may be one or more hops between the carriers. It is also possible the sending and destination mobile devices share the same carrier. The carrier is the entity responsible for administering the telephone number of a subscriber's mobile device and facilitating communication to and from a subscriber's mobile device.

More recently, however, the protocols of SMS messaging have expanded beyond the realm of cellular networks to include packet based data networks such as the Internet. It is now possible for an SMS message to traverse both a circuit switched based cellular network and a packet based data network. This implies an interface between the cellular network and a packet based data network that converts the messages in a manner to allow traversal across either. The expansion of SMS messaging into packet based data networks created the possibility for a new kind of SMS messaging called application to person (A2P) messaging. As the name implies, A2P messaging involves allowing a computer based application to create and send SMS messages to one or more telephone numbers associated with people.

As one might expect, many companies or other entities may wish to notify members, customers or potential customers of information using SMS text messages. SMS messages are a quick and convenient method for reaching specific individuals. Moreover, using A2P applications, SMS messages may be batched and sent all at once making them an extremely efficient mode of communication.

However, the sending of SMS messages is a regulated activity for good reason. People do not wish to be inundated with unsolicited SMS messages much the same way they do not like receiving unsolicited telephone calls. As a result, there are laws and regulations that control how and to whom A2P SMS messages may be sent. The most well known law in the United States is the Telephone Consumer Protection Act (TCPA). The portion of the TCPA relevant to the disclosure herein provides that no person shall receive an A2P message from a sender without having first opted-in to receiving such SMS messages. Moreover, an individual may opt-out at any time simply by replying to a received message with "Stop". There can be significant fines for violating the TCPA. Thus, senders of A2P messages take care to ensure the their send-to lists only include telephone numbers that have opted-in to receive SMS messages.

One method of opting out of receiving SMS messages was the aforementioned stop reply. When the sender receives this reply, they update their send-to list to remove the telephone number associated with the stop reply. Sometimes consent is revoked without the sender receiving the stop reply such as when the user terminates their account with telecommunications carrier. Unfortunately for the sender, they are not proactively informed of such events and may leave the telephone number on the send-to list when it should be removed leaving them open to future TCPA violations. To address this situation, carriers publish daily deactivation lists that list the telephone numbers that are no longer active on their network. The carrier deactivation lists are made publicly available. A2P message senders can cross-reference their send-to lists with the carrier deactivation lists to discover telephone numbers that have been deactivated from that carrier's network implying a revocation of consent to receive SMS messages. This allows senders to further refine their send-to lists to remove telephone numbers that are no longer active.

There is a problem with this method in that it is often over-inclusive meaning that not all deactivated numbers have had their consent to receive SMS messages revoked. Specifically, there is a situation called number porting in which a subscriber decides to switch their service provider from carrier A to carrier B. In such situations, the subscriber has not revoked consent to receive SMS messages but has simply switched service providers. However, the subscriber's telephone number will appear on carrier A's deactivation list because it is no longer associated with carrier A. The problem is that the carrier deactivation lists do not include a reason why a telephone number is on the list.

When an A2P message sender cross-references their send-to lists with the various carrier deactivation lists, they may be removing telephone numbers that have been deactivated due to a number port rather than an actual revocation of consent or termination of an account. When this happens, the send-to list may be unnecessarily culled resulting in the removal of valid consenting recipients of A2P SMS messages.

What is needed are techniques to determine if a telephone number appearing on a carrier deactivation list has been ported and thereby has not opted-out of receiving A2P SMS messages.

SUMMARY

In some embodiments, techniques are described for managing the recipients of application-to-person (A2P) short message service (SMS) messages. A send-to list comprised of telephone numbers to which to send A2P short message service (SMS) messages is received from an A2P sender. The opt-in/opt-out status of each telephone number on the send-to list is determined. Telephone numbers on the send-to list that cannot be verified as opt-in status are flagged as opt-out status. The A2P sender is then prevented from sending of A2P SMS messages to telephone numbers flagged as opt-out status.

In some aspects, techniques for . . . are described. (Each Independent Claim)

DETAILED DESCRIPTION

Various embodiments may include a system, method, apparatus, and/or computer program product that describe and claim techniques to manage and curate the send-to lists of A2P SMS message senders.

As referenced earlier, A2P message senders do not wish to run afoul of the TCPA and incur negative publicity and significant fines due to sending unwanted SMS messages. To avoid violating the TCPA, an A2P SMS message sender may obtain the consent of an end user telephone subscriber (hereinafter 'end user') to receive such SMS messages. The A2P SMS message sender may then maintain a send-to list of such end users that have 'opted-in' to receiving such SMS messages. Moreover, A2P SMS message sender may dynamically curate the send-to list to add new end users that have opted-in and remove end users that have opted-out. In addition, the A2P SMS message sender may periodically (e.g., daily) curate the send-to list to remove end users that appear on carrier deactivation lists.

According to the embodiments described herein, an A2P SMS message sender may take a further step in curating their send-to lists to avoid removing end users that appear on a carrier deactivation list but have not opted-out. This is the number porting scenario described earlier. The additional step may involve filtering the telephone numbers that appear on both the A2P SMS message sender's send-to list and the various carrier deactivation lists against data that may be found in a porting database such as, for instance, the local exchange routing guide (LERG) database.

The LERG is a database that provides information regarding owned telephone numbers at the NPA-NXX block level. NPA references the area code of a telephone number while NXX references the local exchange for a telephone number. The last four digits of a telephone number would also be present in the LERG but are not included in this definition as each is unique. The LERG is updated monthly and highlights the call routing activity that occurs over the Public Switched Telephone Network (PSTN) by carriers. Included in this data is porting information that shows when a telephone number was ported from one carrier to another.

By filtering the send-to list and the various carrier deactivation lists against the porting database, telephone numbers that have been recently ported may be exempted from removal from the send-to list because the end user has not actually opted-out. This process ensures the send-to lists are not unnecessarily overly pruned and that the A2P SMS messages reach all eligible recipients.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

Figure 1:
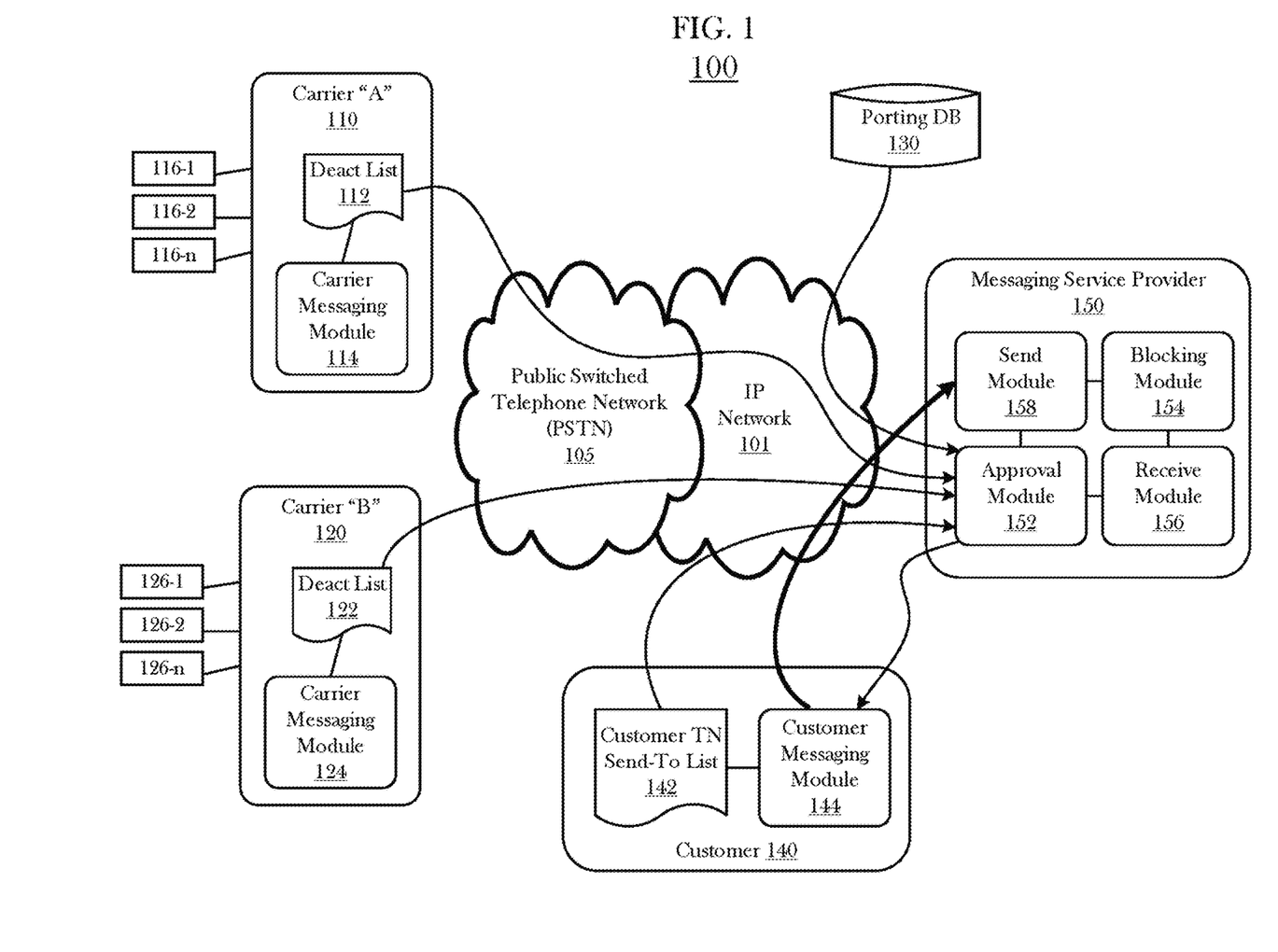
FIG. 1 illustrates an example network architecture according to an embodiment.

FIG. 1 illustrates an example network architecture 100 according to an embodiment. The network architecture 100 illustrates the relationship between a messaging service provider 150 and an A2P customer 140. The A2P customer 140 may contract with the messaging service provider 150 such that the messaging service provider 150 will handle, manage, and deliver the A2P messaging traffic generated by the A2P customer 140. While it is the responsibility of the A2P customer 140 to create and maintain their send-to lists 142 to avoid running afoul of the TCPA, the messaging service provider 150 may be able to provide assistance in curating the send-to list(s) 142 of its customers.

To assist in the performance of its functions, the messaging service provider 150 may be logically divided into an approval module 152, a blocking module 154, a receive module 156, and a send module 158. It should be noted that these are logical labels only and that the functions performed by each may be grouped in many ways with respect to both hardware and software. The use of the logical module terminology is for illustrative and explanatory purposes. For instance, the approval module 152 may be understood to process data to determine whether or not a telephone number is eligible to receive a particular A2P SMS message. The blocking module 154 may be understood to process data to prevent A2P SMS messages from being sent to ineligible telephone numbers. The receive module 156 may be understood to process data to receive, relay, and deliver SMS messages to their intended recipients. The send module 158 may be understood to process data to cause the sending of SMS messages (including A2P SMS messages) to the next hop along the way to the intended end user associated with the telephone number identified in the SMS message.

When an A2P SMS message is created by an A2P customer 140, it is first routed via a messaging module 144 to the messaging service provider 150 where it may be received by a send module 158. The send module 158 will perform the necessary steps to initiate delivery of the A2P SMS message to each of the recipients on the send-to list that accompanies the A2P SMS message. The A2P SMS message may then be routed through one or more packet data networks 101 and circuit switched networks 105 toward the various carriers 110, 120 and finally to their respective end users 116, 126 via their respective carrier messaging modules 114, 124. It should be noted that there are interface(s) (not shown) between the packet data networks 101 and circuit switched networks 105 allow the A2P SMS message to traverse both networks seamlessly. Moreover, there may be one or more intermediate hops (not shown) within the packet data networks 101 and circuit switched networks 105 that enable the delivery of A2P SMS messages.

To manage or curate a send-to list 142, the A2P customer 140 may send the current iteration of the send-to list 142 to the messaging service provider 150 where it is received by an approval module 152. The messaging service provider 150 has some capabilities to access and cross-reference multiple databases and lists and apply some intelligence to determine the status of telephone numbers. For purposes of the techniques described herein, the messaging service provider 150 can access the carrier deactivation lists 112, 122 to determine which (if any) telephone numbers on the send-to list appear on one or more of the carrier deactivation lists 112, 122. This subset of telephone numbers may then be filtered through the porting database 130 to determine additional status of the affected telephone numbers. Specifically, the messaging service provider 150 can determine if the affected telephone numbers have recently been ported from one carrier to another carrier. This is relevant because telephone numbers ported from one carrier to another have no had their opt-in status for receiving A2P SMS messages changed even though the telephone number appears on a carrier's deactivation list. As a result, the messaging service provider 150 via approval module 152 can refine the send-to list 142 to remove only those telephone numbers that appear on the send-to list 142 and one or more carrier deactivation lists 112, 122 that have not been ported to another carrier. Through this process, the send-to list 142 may be refined to maintain TCPA compliance but not over-refined so as to exclude opted-in telephone numbers.

Figure 2:
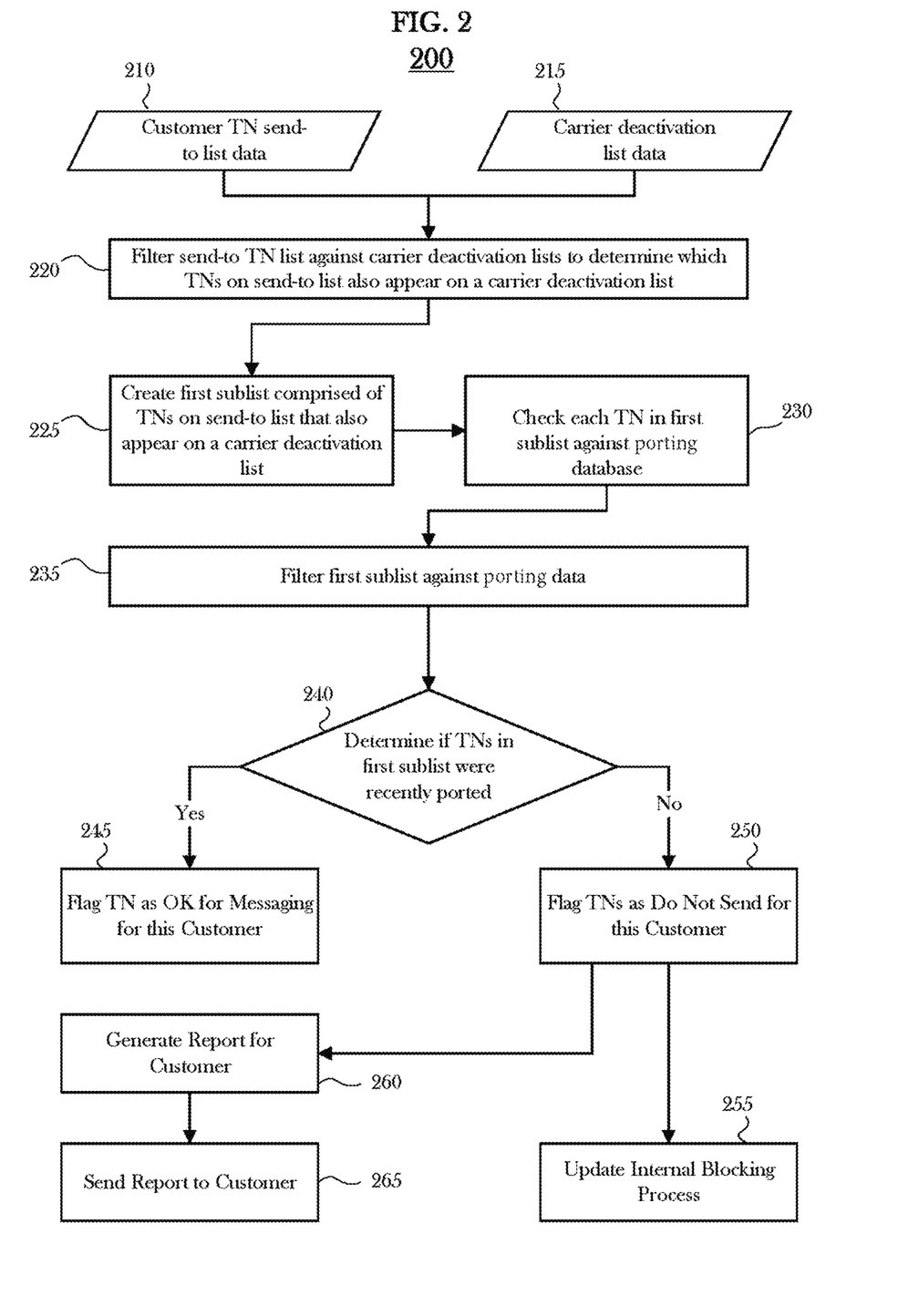
FIG. 2 illustrates a logic flow diagram for updating an A2P message sender's send-to list according to an embodiment.

FIG. 2 illustrates a logic flow 200 diagram for updating an A2P customer's send-to list 142 according to an embodiment. This logic flow may be representative of some or all of the operations executed by one or more logic, features, or devices described herein, such as any devices or systems described above with references to other figures herein. In the illustrated examples shown in FIG. 2, the logic flow 200 may comprise one or more steps or processes involved in allocating and managing resources in a communications network as described elsewhere herein. The embodiments, however, are not limited to the number, type, order or arrangement of steps shown in FIG. 2.

The logic flow 200 starts with the messaging service provider 150 via approval module 152 taking a customer's A2P TN send-to list 142 and one or more carrier deactivation lists 112, 122 and filtering the send-to list 142 against the carrier deactivation lists 112, 122 in step 220 to determine which telephone numbers (TNs) on the send-to list 142 also appear on one or more of the carrier deactivation lists 215. The approval module 152 may receive the send-to list from the A2P customer 140 which may then cause approval module 152 to collect the carrier deactivation lists 112, 122.

In one embodiment, the messaging service provider may scrape, download, or otherwise obtain each carrier's deactivation list once per day and store the results such that they are accessible to the approval module 152 without the approval module having to contact the carrier's directly. This data may be updated as frequently as desired depending on when each carrier releases such data.

Next, approval module 152 may create a sublist comprised of all the TNs on the send-to list 210 that also appeared one at least one of the carrier deactivation lists 112, 122 at step 225. Each TN on the sublist may then be status checked against the porting database 130 in step 230. Specifically, the TNs on the sublist get their porting status checked to determine if any of the TNs on the sublist have been recently ported from one carrier to another carrier at decision block 235. If a TN on the sublist has been recently ported from one carrier to another carrier, it is flagged as not having its opt-in status changed at step 240. This means this TN may remain on the send-to list 142 because it has not undergone a status changing event despite its appearance on a carrier deactivation list 112, 122.

Alternatively, if a TN on the sublist has not been recently ported from one carrier to another carrier, it is flagged as having its opt-in status changed to opted-out at step 245. This is because the TN is no longer associated with the end user or the carrier, at least not in an active manner. As such, the default revocation of the opt-in status kicks in. Practically speaking, this TN is flagged for removal from the send-to list 142. The approval module 152 may then inform and cause the blocking module 154 to update its internal blocking process to prevent this A2P sender from sending an A2P SMS message to the TN at step 250.

Once all the TNs on the sublist have been filtered against the porting data, the messaging service provider 150 via approval module 152 may generate a report comprised of updates to be made to the send-to list 142 at step 255. This report may then be sent to the A2P customer 140 in step 260. The A2P customer may then refine and update their send-to list(s) 142 accordingly.

Figure 3:
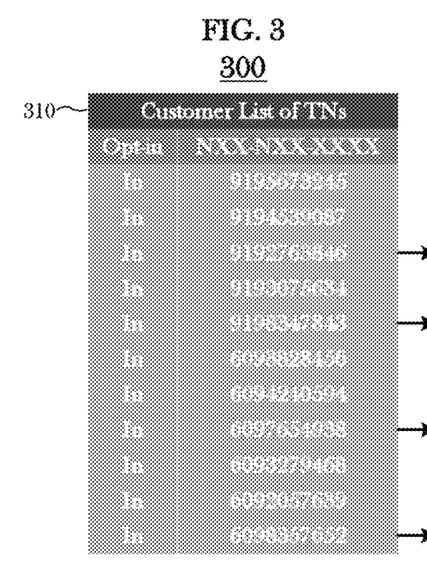
FIG. 3 illustrates an example of an A2P message sender's send-to list of telephone numbers according to an embodiment.

FIG. 3 illustrates an example of an A2P customer's 140 send-to list 300 of telephone numbers according to an embodiment. The purpose of the send-to list 300 is to describe the type of information that may appear on such a list. The exact format and file type of the send-to list 300 may vary. The send-to list 300 shown here is comprised of two columns—one column describing the opt-in status for A2P messaging and another column listing the telephone numbers to receive A2P messages. The send-to list 300 represents the distribution list of an A2P message. When the A2P customer 140 initiates an A2P message, this list defines the intended recipients of the A2P message.

Figure 4:
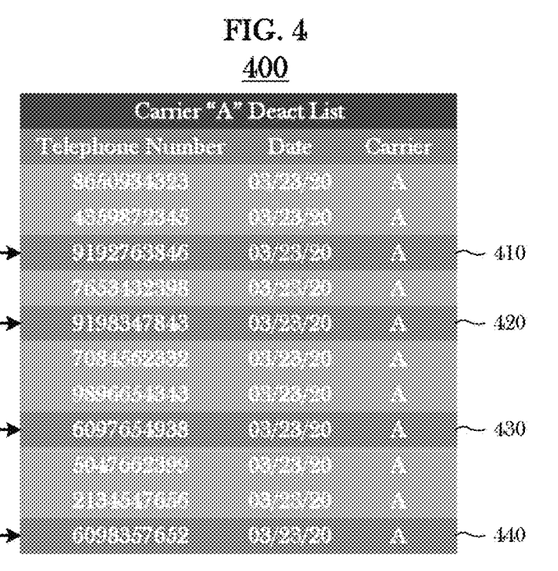
FIG. 4 illustrates an example of carrier's deactivation list of telephone numbers according to an embodiment.

FIG. 4 illustrates an example of carrier's deactivation list 400 of telephone numbers according to an embodiment. The purpose of the carrier deactivation list 400 is to describe the type of information that may appear on such a list. The exact format and file type of such a carrier deactivation list 400 may vary. The carrier deactivation list 400 shown here is comprised of three columns—one column listing the telephone numbers that have been deactivated by the carrier, a second column listing the date the telephone numbers appeared on the carrier deactivation list 400, and a third column listing the identity of the carrier. In this example, four of the telephone numbers highlighted in rows 410, 420, 430, 440 appearing in carrier deactivation list 400 also appear on the send-to list 300. Because these four telephone numbers appear on the carrier deactivation list 400, the A2P customer 140 would typically remove them from the send-to list 300 as the opt-in status for each of the telephone numbers is assumed to have changed. That may not be true, however, as in the case of a number port. By filtering the sublist of telephone numbers that appear on both the send-to list 300 and the carrier deactivation list(s) 400 against the porting data, the A2P customer 140 (via messaging service provider 150) can get a more accurate update of the actual opt-in status of a telephone number.

Each carrier may have their own carrier deactivation list 400. The carrier deactivation list 400 shown here has been attributed to carrier "A". The process described above in FIG. 3, step 220 would involve carrier deactivation lists from multiple carriers. Only carrier "A" has been illustrated in an effort to simplify the description.

Figure 5:
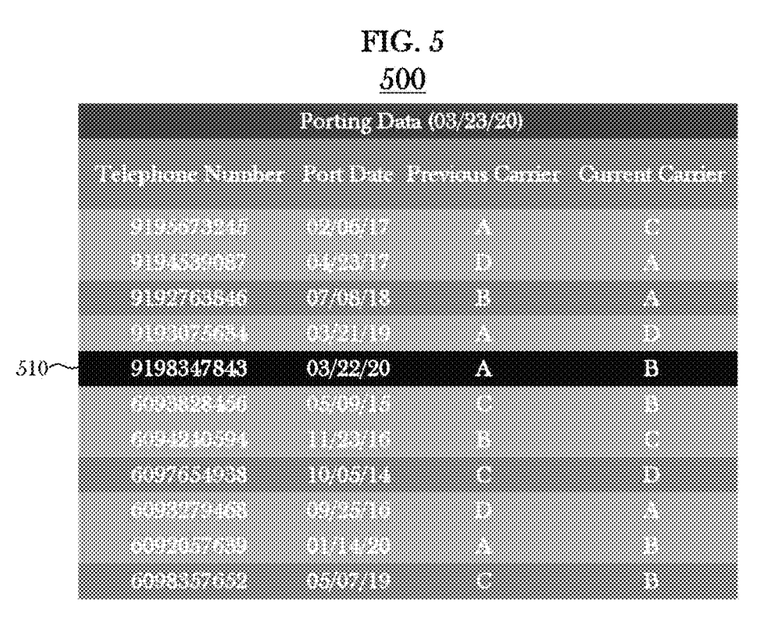
FIG. 5 illustrates an example of data that may be found in a porting database according to an embodiment.

FIG. 5 illustrates an example of data 500 that may be found in a porting database such as the LERG database according to an embodiment. The purpose of this illustration of data 500 is to describe the type of information that may be obtainable from a porting database 130. The exact format and file type of such data 500 may vary. The porting data 500 shown here is comprised of four columns—one column listing the telephone numbers, a second column listing the port date of the telephone numbers, a third column listing the identity of the previous carrier, and a fourth column listing the identity of the current carrier.

In this example, the sublist of telephone numbers 410, 420, 430, 440 from FIG. 4 has one telephone number that appears in the LERG data 500. Specifically, row 510 of the porting data 500 indicates that telephone number 9198347843 corresponding to row 420 of FIG. 4 has been ported from carrier A to carrier B on or about 03/22/2020. This is significant in that porting a telephone number does not change the end user of the telephone number. Rather, the end user is switching from one carrier to another carrier usually because they can get cheaper service or better quality service. Because, the end user for the telephone number has not changed, the opt-in status associated with that telephone number has not changed either despite the telephone number appearing on a carrier's deactivation list.

The messaging service provider 150 may vet its A2P customer's send-to lists 142 using the process(es) described in FIG. 2 using the data described in FIGS. 3-5. This vetting process may be an added feature or tool made available to the A2P customer 140. The results of such processing allow the messaging service provider 150 to automatically curate the send-to list(s) 142 for future A2P messaging events. This may include automatically flagging certain telephone numbers as do-not-send on certain send-to lists 142 such that when an A2P customer 140 attempts to send to a flagged telephone number, that telephone number will be rejected. In another embodiment, the messaging service provider 150 may automatically edit the send-to list 142 and send it back to the A2P customer 140. In another embodiment, the messaging service provider 150 may send the results of the process in the form of a report back to the A2P customer 140 so that the A2P customer 140 can edit the list accordingly.

Figure 6:
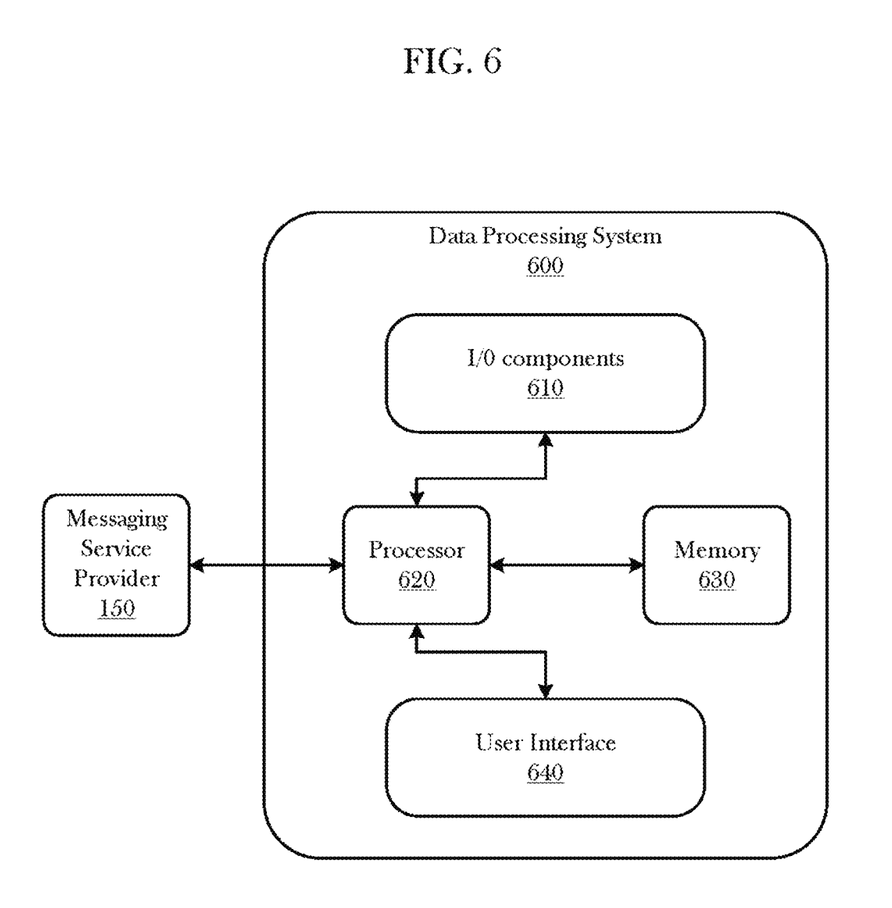
FIG. 6 illustrates an example of a computer based data processing system.

FIG. 6 illustrates an example of a computer based data processing system 600 suitable for use with any of the examples described above. Although the example data processing system 600 is shown as in communication with a messaging service provider 150 in accordance with embodiments of the present inventive concept, the data processing system 600 may also be part of the messaging service provider 150 without departing from the scope of the present inventive concept. In some examples, the data processing system 600 can be any suitable computing device for performing operations according to the embodiments discussed herein described herein.

As illustrated, the data processing system 600 includes a processor 620 communicatively coupled to I/O components 610, a user interface 640 and a memory 630. The processor 620 can include one or more commercially available processors, embedded processors, secure processors, microprocessors, dual microprocessors, multi-core processors, other multi-processor architectures, another suitable processing device, or any combination of these. The memory 630, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 620.

I/O components 610 may be used to facilitate wired or wireless connections to devices such as one or more displays, game controllers, keyboards, mice, joysticks, cameras, buttons, speakers, microphones and/or other hardware used to input or output data. Memory 630 represents non-volatile storages such as magnetic, optical, or other storage media included in the data processing system and/or coupled to processor 620.

The user interface 640 may include, for example, a keyboard, keypad, touchpad, voice activation circuit, display or the like and the processor 620 may execute program code or instructions stored in memory 630.

It should be appreciated that data processing system 600 may also include additional processors, additional storage, and a computer-readable medium (not shown). The processor(s) 620 may execute additional computer-executable program instructions stored in memory 630. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon( ) Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure.

Moreover, not all operations illustrated in a flow logic or method may be required for a novel implementation.

Where any operation or component discussed herein is implemented in the form of software, any one of a number of programming languages may be employed such as, for example, C, C++, C #, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims may reflect, inventive subject matter may lie in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims.

The invention claimed is:

1. A method, comprising; receiving, from an application-to-person (A2P) sender, a send-to list comprised of telephone numbers to which to send A2P short message service (SMS) messages; verifying the opt-in and opt-out status of each telephone number on the send-to list wherein opt-in status means an end user associated with the telephone number has consented to receiving A2P SMS messages from the A2P sender and opt-out status means the opt-in status has been revoked; flagging the telephone numbers on the send-to list that cannot be verified as opt-in status as opt-out status; and preventing the sending of A2P SMS messages from the A2P sender to telephone numbers flagged as opt-out status; and wherein the verifying step comprising: accessing one or more carrier deactivation lists comprised of telephone numbers that have been deactivated by that carrier; creating a sublist comprised of all telephone numbers that appear on send-to list and at least one of the carrier deactivation lists; accessing porting data for each telephone number on the sublist to determine if any of the telephone numbers on the sublist were ported from one carrier to another carrier proximate to the date the telephone number appeared on a carrier deactivation list; flagging a telephone number as opt-in status when a telephone number has been determined to have been ported from one carrier to another carrier; and flagging a telephone number as opt-out status when a telephone number has not been determined to have been ported from one carrier to another carrier.

2. The method of claim 1, the porting data comprised of data found in local exchange routing guide (LERG) data.

3. The method of claim 1, the preventing the sending of A2P SMS messages to telephone numbers flagged as opt-out status comprising removing telephone numbers flagged as opt-out status from the send-to list.

4. The method of claim 1, the preventing the sending of A2P SMS messages to telephone numbers flagged as opt-out status comprising blocking telephone numbers flagged as opt-out status.

5. The method of claim 1, comprising reporting telephone numbers flagged as opt-out status to the A2P sender.

6. The method of claim 1, comprising: editing the send-to list to remove telephone numbers flagged as opt-out status; and sending the edited send-to list back to the A2P sender.

7. At least one non-transitory machine-readable medium comprising a set of instructions executable on at least one computing device to cause the at least one computing device to perform application-to-person (A2P) short message service (SMS) recipient verification, the set of instructions to: receive, from an A2P sender, a send-to list comprised of telephone numbers to which to send A2P SMS messages; verify the opt-in and opt-out status of each telephone number on the send-to list wherein opt-in status means an end user associated with the telephone number has consented to receiving A2P SMS messages from the A2P sender and opt-out status means the opt-in status has been revoked; flag the telephone numbers on the send-to list that cannot be verified as opt-in status as opt-out status; and prevent the sending of A2P SMS messages from the A2P sender to telephone numbers flagged as opt-out status; and wherein the set of instructions executable on the at least one computing device to: access one or more carrier deactivation lists comprised of telephone numbers that have been deactivated by that carrier; create a sublist comprised of all telephone numbers that appear on send-to list and at least one of the carrier deactivation lists; access porting data for each telephone number on the sublist to determine if any of the telephone numbers on the sublist were ported from one carrier to another carrier proximate to the date the telephone number appeared on a carrier deactivation list; flag a telephone number as opt-in status when a telephone number has been determined to have been ported from one carrier to another carrier; and flag a telephone number as opt-out status when a telephone number has not been determined to have been ported from one carrier to another carrier.

8. The non-transitory machine-readable medium of claim 7, the porting data comprised of data found in local exchange routing guide (LERG) data.

9. The non-transitory machine-readable medium of claim 7, the set of instructions executable on the at least one computing device for preventing the sending of A2P SMS messages to telephone numbers flagged as opt-out status to: remove telephone numbers flagged as opt-out status from the send-to list.

10. The non-transitory machine-readable medium of claim 7, the set of instructions executable on the at least one computing device for preventing the sending of A2P SMS messages to telephone numbers flagged as opt-out status to: block telephone numbers flagged as opt-out status.

11. The non-transitory machine-readable medium of claim 7, the set of instructions executable on the at least one computing device to: report telephone numbers flagged as opt-out status to the A2P sender.

12. The non-transitory machine-readable medium of claim 7, the set of instructions executable on the at least one computing device to: edit the send-to list to remove telephone numbers flagged as opt-out status; and send the edited send-to list back to the A2P sender.

13. A computer, comprising: one or more processors; and a non-transitory computer readable medium to store a set of instructions executable by the one or more processors, the set of instructions to cause the one or more processors to: receive, from an application-to-person (A2P) sender, a send-to list comprised of telephone numbers to which to send A2P short message service (SMS) messages; verify the opt-in and opt-out status of each telephone number on the send-to list wherein opt-in status means an end user associated with the telephone number has consented to receiving A2P SMS messages from the A2P sender and opt-out status means the opt-in status has been revoked; flag the telephone numbers on the send-to list that cannot be verified as opt-in status as opt-out status; and prevent the sending of A2P SMS messages from the A2P sender to telephone numbers flagged as opt-out status; and wherein the set of instructions to cause the one or more processors to: access one or more carrier deactivation lists comprised of telephone numbers that have been deactivated by that carrier; create a sublist comprised of all telephone numbers that appear on send-to list and at least one of the carrier deactivation lists; access porting data for each telephone number on the sublist to determine if any of the telephone numbers on the sublist were ported from one carrier to another carrier proximate to the date the telephone number appeared on a carrier deactivation list; flag a telephone number as opt-in status when a telephone number has been determined to have been ported from one carrier to another carrier; and flag a telephone number as opt-out status when a telephone number has not been determined to have been ported from one carrier to another carrier.

14. The computer of claim 13, the porting data comprised of data found in local exchange routing guide (LERG) data.

15. The computer of claim 13, the set of instructions to cause the one or more processors to prevent the sending of A2P SMS messages to telephone numbers flagged as opt-out status to: remove telephone numbers flagged as opt-out status from the send-to list.

16. The computer of claim 13, the set of instructions to cause the one or more processors to prevent the sending of A2P SMS messages to telephone numbers flagged as opt-out status to: block telephone numbers flagged as opt-out status.

17. The computer of claim 13, the set of instructions to cause the one or more processors to: report telephone numbers flagged as opt-out status to the A2P sender.

18. The computer of claim 13, the set of instructions to cause the one or more processors to: edit the send-to list to remove telephone numbers flagged as opt-out status; and send the edited send-to list back to the A2P sender.

* * * * *